(12) United States Patent
Syvertsen et al.

(10) Patent No.: US 8,003,251 B2
(45) Date of Patent: Aug. 23, 2011

(54) ELECTROCHEMICAL CELL GROMMET HAVING A SIDEWALL WITH A NONUNIFORM THICKNESS

(75) Inventors: Marc L. Syvertsen, Madison, WI (US); Jeremy W. Chapman, Portage, WI (US)

(73) Assignee: Rovcal, Inc., Madison, WI (US)

( * ) Notice: Subject to any disclaimer, the term of this patent is extended or adjusted under 35 U.S.C. 154(b) by 965 days.

(21) Appl. No.: 11/608,159

(22) Filed: Dec. 7, 2006

(65) Prior Publication Data

US 2008/0138705 A1 Jun. 12, 2008

(51) Int. Cl.
*H01M 4/02* (2006.01)
*H01M 2/02* (2006.01)
*H01M 6/00* (2006.01)

(52) U.S. Cl. .................. 429/209; 429/122; 429/171

(58) Field of Classification Search .................. 429/122, 429/171, 209
See application file for complete search history.

(56) References Cited

U.S. PATENT DOCUMENTS

| 3,723,184 A | 3/1973 | Stark et al. |
| 4,656,104 A | 4/1987 | Tucholski |
| 6,042,957 A | 3/2000 | Oltman |
| 6,087,030 A * | 7/2000 | Collien et al. .................. 429/29 |
| 6,245,452 B1 | 6/2001 | Oltman |
| 6,248,463 B1 | 6/2001 | Dopp et al. |
| 6,274,267 B1 * | 8/2001 | Pate .............................. 429/185 |
| 6,280,876 B1 | 8/2001 | Burns |
| 2006/0083985 A1 | 4/2006 | Dunham |
| 2006/0183019 A1 | 8/2006 | Davidson et al. |
| 2006/0183020 A1 | 8/2006 | Davidson et al. |

FOREIGN PATENT DOCUMENTS

| EP | 0279348 | | 8/1988 |
| JP | 2003045382 A | * | 2/2003 |
| WO | 0052772 | | 9/2000 |

OTHER PUBLICATIONS

Extended European Search Report regarding European Patent Application No. 07254757.3 dated Mar. 17, 2008.

* cited by examiner

*Primary Examiner* — Karie O'Neill Apicella
(74) *Attorney, Agent, or Firm* — Armstrong Teasdale LLP

(57) ABSTRACT

The present disclosure relates generally to an electrochemical cell such as a battery, and more particularly to an improved grommet suitable for electrically insulating an anode can from a cathode can of an electrochemical cell. In particular, the present disclosure relates to an improved grommet that has a tubular sidewall that varies in thickness from top to bottom.

20 Claims, 8 Drawing Sheets

601  309  602

ELECTROCHEMICAL CELL GROMMET HAVING A SIDEWALL WITH A NONUNIFORM THICKNESS

FIELD OF THE DISCLOSURE

The present disclosure relates generally to an electrochemical cell such as a battery, and more particularly to an improved grommet suitable for electrically insulating an anode can from a cathode can of an electrochemical cell. In particular, the present disclosure relates to an improved grommet that has a tubular sidewall that varies in thickness from top to bottom, which, for example, is suitable for use in a button cell.

BACKGROUND OF THE DISCLOSURE

Electrochemical button cells are suitable for use in applications in which the space available for a battery is minimal, such as in hearing aids and other small electrically-powered devices. The phrase "button cell" generally refers to the shape of the cell being relatively disc-shaped, like a garment button. One common button cell having relatively high energy density is a metal-air cell, which comprises a metal-containing anode and an air cathode. However, the small size and limited amount of electrochemically reactive material in even a metal-air cell limits the useful operating life of the cell.

FIG. 1 is a cross section of a metal-air button cell, generally designated 1, comprised of an electrically conductive anode can 5 received in an electrically conductive cathode can 10. An air cathode assembly 14 overlays the bottom wall 12 of the cathode can 10 within the cell and is in electrical contact with the cathode can. Anode material 6, which is a mixture of metal powder (commonly zinc) and an electrolyte (e.g., a solution of potassium hydroxide and water) is contained within the anode can in electrical contact therewith. A separator 18 separates the air cathode assembly 14 from the anode material 6.

A generally cylindrical, and more particularly annular, thin-walled dielectric (e.g., electrically non-conductive) grommet 25 (also commonly referred to as a "gasket" or "seal") electrically insulates the anode can 5 from direct electrical contact with the cathode can 10 and forms a seal therebetween to sealingly close the reactive materials within the cell 1. The grommet 25 has an annular or tubular sidewall 29 having a thickness that is essentially the same, top to bottom, with an integrally formed annular foot 27 extending radially inward from the lower end or bottom of the sidewall. The foot 27 defines an annular shoulder 31 on which the terminal (e.g., lower) end 33 of the anode can sits upon assembly of the cell 1. The terminal (e.g., upper) end 39 of the cathode can 10 is crimped over the edge margin of the top of the anode can 5 to secure the cell 1 in its assembled configuration.

Metal-air cells such as that illustrated in FIG. 1 take in atmospheric oxygen via openings 19 formed in the bottom of the cathode can 10, and convert the oxygen to hydroxyl ions in the air cathode assembly 14 by interaction with the electrolyte, when the cell is being discharged. The hydroxyl ions then migrate to the anode material 6, where they interact with the metal anode material, which undergoes an oxidation reaction forming, for example, zinc oxide. Since the overall capacity (e.g., useful life) of any electrochemical cell is to some extent determined by the quantity of electrochemically reactive materials (e.g., the volume of anode materials) within the interior of the cell 1, and since a metal-air cell stores only the anode material internally (using atmospheric oxygen as the other reaction component), a common goal in cell design is to maximize the size (e.g., volume) of the interior cavity, and in the case of metal-air cells, more specifically the anode cavity.

It is understood that by making the grommet 25 thinner, the volume of the interior cavity of the cell could be increased (e.g., by allowing the inner diameter of the anode can to increase) without increasing the outer size of the cell. Alternatively, the size of the cell could be made smaller without decreasing the useful life of the cell if the grommet were made thinner. However, thinner grommets may present issues during fabrication of the cells and may also present cosmetic issues in finished cells. For example, thinner grommets may lose their circular shape or may collapse entirely during fabrication of cells. In addition, the portion of thinner grommets situated near the point where the terminal end 39 of the cathode can 10 is crimped over the edge margin of the top of the anode may wrinkle, negatively impacting the appearance and/or seal of the finished cell. Thus, the need exists for a grommet that provides increased volume of the interior cavity of the cell, or that allows for reducing the size of the cell without decreasing the useful life of the cell, but that also exhibits sufficient structural integrity to avoid the problems that may be associated with relatively thin grommets during cell fabrication and the cosmetic issues that may be associated with thin grommets in finished cells.

SUMMARY OF THE DISCLOSURE

Briefly, the present disclosure is directed to a grommet for use in an electrochemical button cell to electrically insulate an anode can from a cathode can of the button cell. The grommet is constructed of a dielectric material and includes a generally tubular sidewall, the sidewall having an upper portion and a lower portion, the upper portion having a thickness that exceeds a thickness of the lower portion by at least about 20%.

The present disclosure is further directed to an electrochemical button cell including the above-noted grommet. More specifically, the electrochemical button cell includes: (i) a cathode having an electrically conductive cathode can having a bottom wall and a sidewall extending up from the bottom wall, the bottom wall and sidewall together defining a cavity of the cathode can; (ii) an anode having an electrically conductive anode can having a top wall and a sidewall depending from the top wall, the top wall and the sidewall of the anode can together defining a cavity thereof, the anode can being at least in part disposed in the cathode can with at least a portion of the anode can sidewall in generally opposed relationship with at least a portion of the cathode can sidewall; and (iii) a dielectric grommet, as detailed above.

Other advantages and features will be in part apparent and in part pointed out hereinafter.

Figure 1:
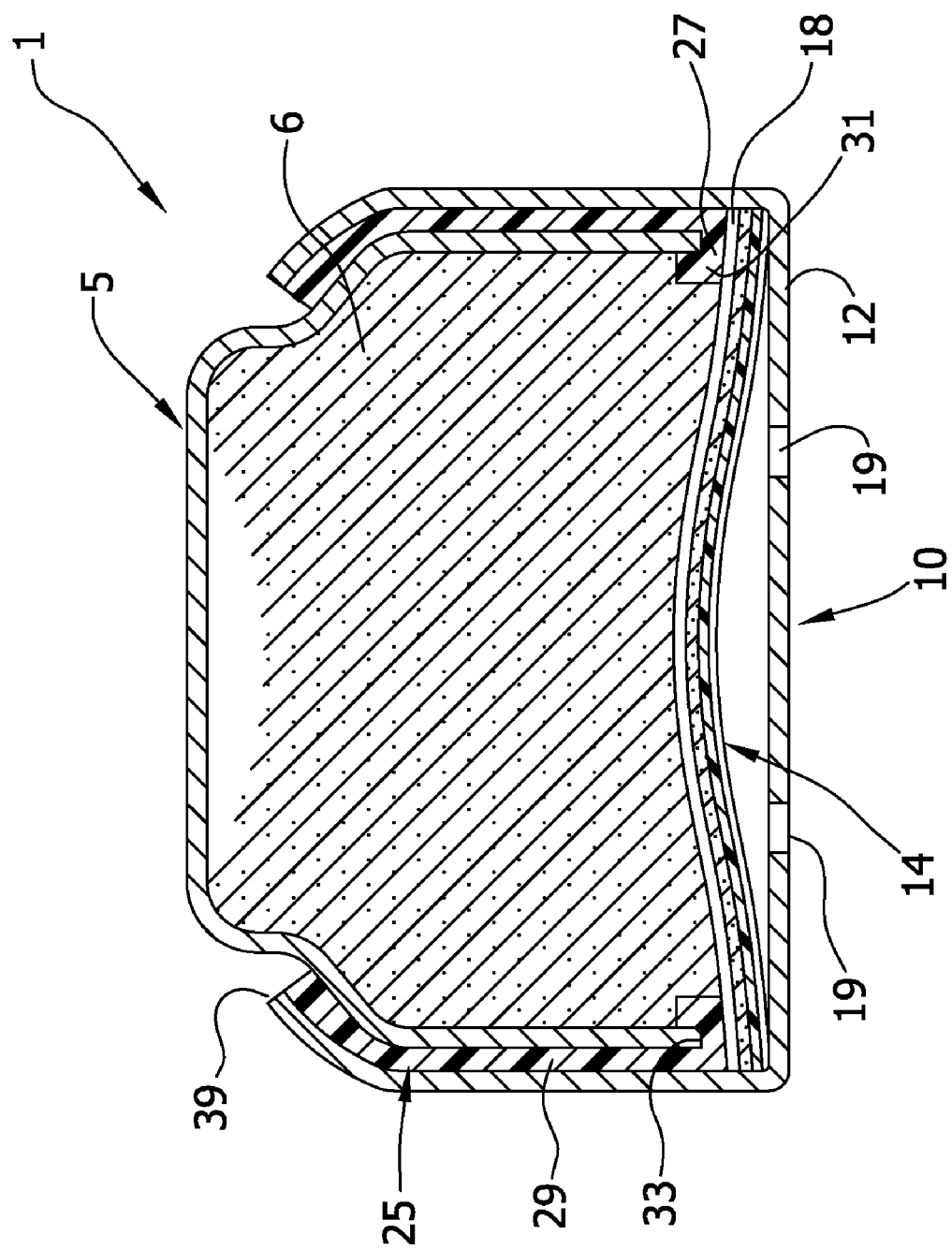
FIG. 1 illustrates a perspective view of a cross section of an electrochemical button cell, wherein the grommet present therein has a substantially constant or uniform thickness over the height thereof.

It is to be noted that the figures presented herein are provide for illustration, and therefore are not necessarily to scale (either within a given figure, or from one figure to another). Additionally, it is to be noted that corresponding reference characters indicate corresponding parts throughout the figures.

DETAILED DESCRIPTION OF THE DISCLOSURE

In accordance with the present disclosure, it has been discovered that a grommet having a cylindrical (i.e., tubular or annular) sidewall that varies in thickness from top to bottom (i.e., has a top portion with a thickness that exceeds the thickness of a lower portion thereof) may be used to increase the volume of the interior cavity of the cell without increasing the size of the cell. Such a grommet has also been found to exhibit suitable structural integrity. In particular, the grommet of the present disclosure includes a relatively thinner lower portion that enables an increase in the volume of the interior cavity of the cell without increasing the overall size of the cell, and a relatively thicker upper portion that provides improved structural integrity to the grommet during cell manufacture and in the finished cell.

I. Cell and Grommet Design

Figure 2:
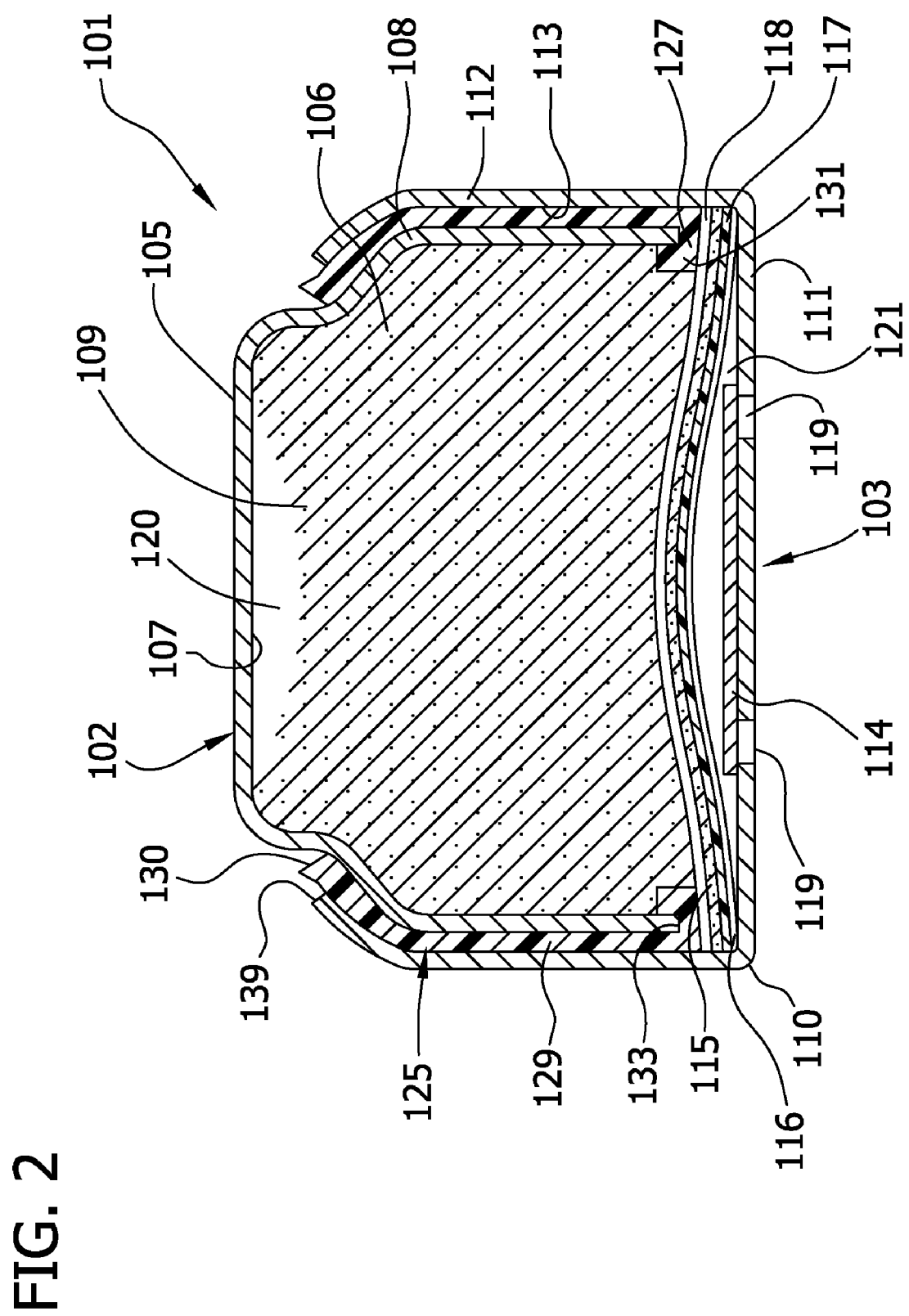
FIG. 2 illustrates a perspective view of a cross section of one embodiment of a button cell of the present disclosure, wherein the grommet does not have a substantially constant or uniform thickness over the height thereof.

Referring now to the drawings and in particular to FIG. 2, an electrochemical cell according to one embodiment of the present disclosure is illustrated as a button cell and generally indicated at 101. More particularly, the illustrated cell 101 is a metal-air cell similar to the cell depicted in FIG. 1. It is understood, however, that the present disclosure has application to electrochemical cells other than button cells, and/or to button cells of a design other than herein described or illustrated.

The cell 101 depicted in FIG. 2 includes a negative electrode, or anode, generally indicated at 102, and a positive electrode, or cathode, generally indicated at 103. The anode 102 includes an electrically conductive anode can 105 and an electrochemically reactive anode material 106 contained therein. The anode can 105 has a top wall 107 and a circumferential (and in the illustrated embodiment, annular) sidewall 108 formed integrally with and depending from the top wall to a terminal (e.g., lower in the illustrated embodiment) end 133 of the anode can. The top wall 107 and annular sidewall 108 of the anode can 105 together define an interior cavity 109 of the anode can in which the electrochemically reactive anode material 106 and a void space 120 are contained. As an example, the reactive anode material 106 may suitably comprise a mixture of metal powder (e.g., zinc) and an electrolyte (e.g., a solution of potassium hydroxide and water). However, other known electrochemically reactive materials may be used without departing from the scope of this disclosure (such as for examples those noted elsewhere herein).

The cathode 103 includes a cathode can 110 constructed of an electrically conductive material and having a bottom wall 111 and a circumferential (and in the illustrated embodiment, annular) sidewall 112 extending up from the bottom wall to a terminal (e.g., upper in the illustrated embodiment) end 139 of the cathode can. The bottom wall 111 and sidewall 112 together define a cavity 113 of the cathode can 110 sized for receiving the anode can 105 therein. Air holes 119 are formed in the bottom wall 111 of the cathode can 110 to permit air flow into the cavity 113.

Within the cavity 113 defined by the cathode can 110, the cathode 103 also includes an air diffusion member 114, which is made of, for example, a non-woven, paper-like material. The air diffusion member is in contact with the bottom wall 111 of the cathode can 110 and has a diameter that is (i) sufficient to cover at least a portion of the air holes 119 present in the bottom wall 111 of the cathode can 110, but (ii) less than the inner diameter of the bottom wall 111 of the cathode can 110 (and therefore is not substantially squeezed or compressed between the grommet foot 127 and the bottom wall of the cathode can when the cell is closed, as further detailed elsewhere herein). Additionally, within the cavity 113 of the cathode can 110, the cathode 103 includes a single layer 116 of a film, such as a Teflon® film, which overlays the air diffusion member 114, the bottom wall 111 of the cathode can and the air reservoir 121, and which has a diameter about equal to the inner diameter of the bottom wall of the cathode can (and therefore will be squeezed or compressed between the grommet foot 127 and the bottom wall of the cathode can when the cell is closed, and thus may arch upward, as illustrated and as further detailed elsewhere herein).

Also present within the cavity 113 of the cathode can 110 is an air cathode assembly, which overlays the single film layer 116, the air diffusion member 114, the bottom wall 111 and the air reservoir 121. In the illustrated embodiment, the cathode assembly includes a layer 117 of a film (e.g., an air diffusion layer) that is laminated to a cathode catalyst layer 115 on the side facing the bottom wall 111 of the cathode can 110, while a separator 118 is attached to (e.g., glued) the cathode catalyst layer on the side facing the anode 102. The (air diffusion) layer 117 may be a layer of a micro-porous hydrophobic substance or film (e.g., polytetrafluoroethylene, or Teflon®). The separator 118 may be constructed of a micro-porous film (e.g., a poly-propylene film) permeable to water and hydroxyl ions but impervious to solid particles. The cathode catalyst layer 115 of the cathode assembly includes a current collector (not illustrated) embedded therein, and a material capable of reducing oxygen in the presence of water and forming hydroxyl ions, such as catalyzed carbon. The current collector may be a conductive structure (e.g., a woven nickel screen) embedded in the cathode catalyst layer 115, and may contact the cathode can 110 at the periphery of the current collector when the cell is closed, the film layer 116 and the air cathode assembly (i.e., the air diffusion layer 117, the cathode catalyst layer 115, and the separator 118), and thus the current collector therein, being squeezed or compressed between the grommet foot 127 and the bottom wall 111 of the cathode can 110 (thus causing them to arch upward, as illustrated and as further detailed elsewhere herein).

A grommet 125, constructed in accordance with one embodiment of the present disclosure, is at least in part disposed between the anode can sidewall 108 and the cathode can sidewall 112 to electrically insulate the anode can 105 from the cathode can 110. In the illustrated embodiment, the grommet 125 includes a cylindrical, and more suitably tubular, and even more suitably annular, sidewall 129 extending from about the terminal end 133 of the anode can 105 to a terminal (e.g., upper in the illustrated embodiment) end 130 of the grommet sidewall that extends beyond the terminal end 139 of the cathode can 110. Thus, the grommet sidewall 129 separates the anode can sidewall 108 from the cathode can sidewall 112, and forms a seal therebetween.

In this regard it is to be noted that the grommet (e.g., a dielectric grommet) may be made from essentially any electrically non-conductive or insulating material known by one of ordinary skill in the art to be suitable for such uses, including, for example, nylon. The grommet, particularly the nylon grommet, is typically not compressed to a significant degree, at least in part because the maximum hoop strength of the metal pieces of the cell (as detailed elsewhere herein) limits the compressive stress exerted on the grommet, typically, for example, to a stress in the range of about 200 to about 400 pounds per square inch (p.s.i.). Such compressive forces typically only result in a small elastic compression or deformation of the grommet (e.g., about 0.1 to about 0.3%).

Figure 3:
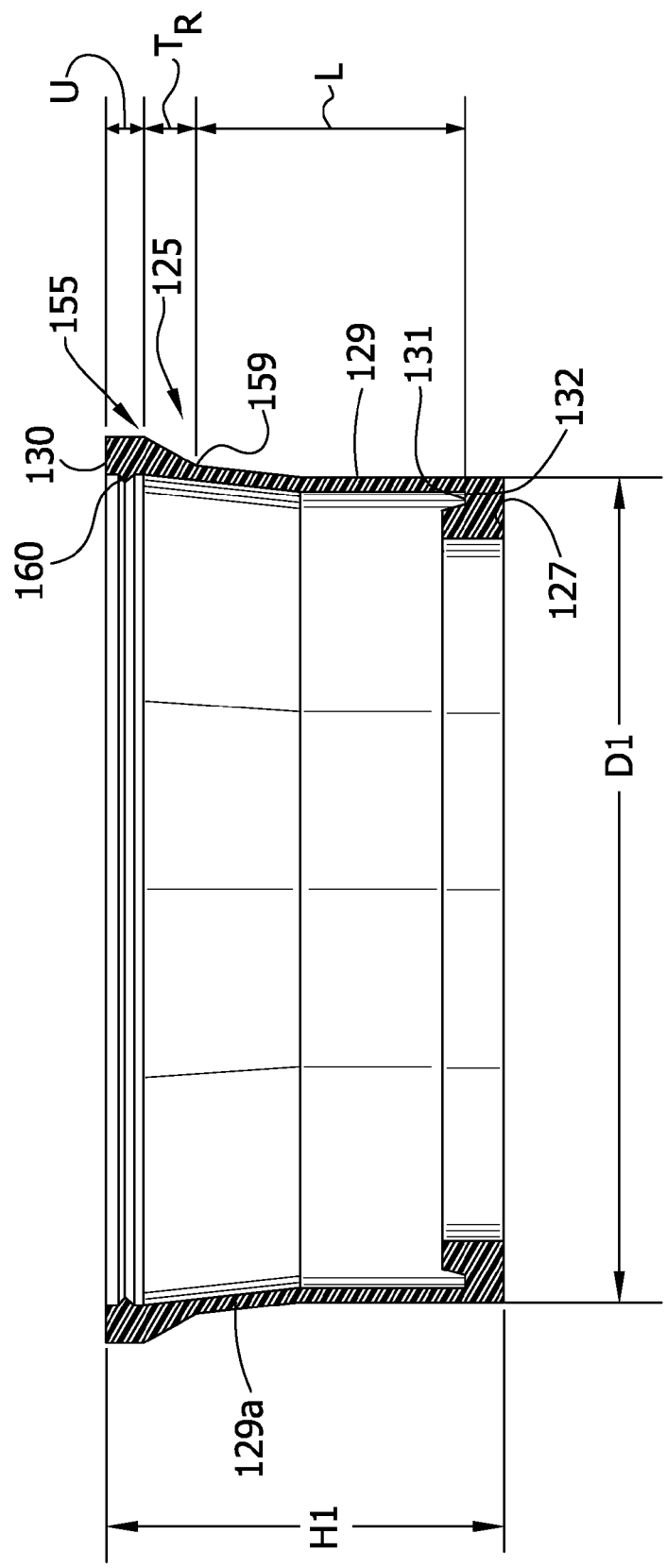
FIG. 3 illustrates a cross-section of a grommet of one embodiment of the present disclosure having portions of varying thicknesses, wherein the top portion has a thickness which exceeds the thickness of the bottom portion.

In accordance with the present disclosure, and with reference to FIGS. 2 and 3, the grommet sidewall varies in thickness from top to bottom (i.e., has a top portion with a thickness that exceeds the thickness of a lower portion thereof), and thus includes portions or regions of varying thicknesses. In various embodiments, and as further detailed herein below, the grommet sidewall 129 includes a lower portion that extends from about the terminal end 133 of the anode can 105 (e.g., in a generally upward direction along the grommet sidewall 129, as depicted in FIG. 2), and an upper portion that extends from a terminal end 130 of the grommet sidewall 129 (e.g., in a generally downward direction along the grommet sidewall 129, as depicted in FIG. 2).

As further detailed elsewhere herein below, in one embodiment the upper and lower portions of the grommet sidewall 129 may not intersect; rather, these two portions may have an intervening transition portion or region that extends therebetween. Thus, the upper portion may extend from terminal end 130 of the grommet sidewall 129 (e.g., in a generally downward direction, as illustrated in FIG. 2) to a point 155 (as illustrated in FIG. 3) along the grommet sidewall, and the lower portion may extend from about the terminal end 133 of the anode can 105 (e.g., in a generally upward direction, as illustrated in FIG. 2) to a point 159 (as illustrated in FIG. 3) along the grommet sidewall 129, the portion extending between these two point illustrating the noted transition portion.

As illustrated in FIG. 3, the thicknesses of the upper and lower portions of the grommet sidewall differ. In general, the lower portion of the grommet generally has a thickness that is less than that of conventionally employed grommets, which have a substantially constant thickness, while the upper portion of the grommet generally has a thickness that is greater than that of conventionally employed grommets. The relatively thin lower portion of the present grommet allows for an increased anode can diameter, which in turn provides an increase in the volume of the interior cavity of the cell, without increasing the overall size of the cell. At the same time, the upper, relatively thick portion of the present grommet provides the grommet with improved structural integrity during cell fabrication and in the finished cell. In this manner, the present grommet provides increased volume of the interior cavity of the cell, but is much less prone to losing the circular shape during cell manufacture and/or wrinkling in the finished cell than conventional grommets. Advantageously, the relatively thick upper portion of the present grommet contributes to the structural stability of the grommet, while resulting in little or no decrease in the overall volume of the cell.

Referring again to FIG. 2, in addition to sidewall 129, grommet 125 also has a foot 127 formed integrally with the bottom or lower end of the grommet sidewall 129 and extending transverse to the grommet sidewall (e.g., radially inward of the sidewall in the illustrated embodiment). The foot 127 includes an upstanding flange portion that together with the rest of the foot defines a shoulder 131 on which the terminal end 133 of the anode can 105 is seated upon assembly of the cell 101. Accordingly, as used herein, the sidewall 129 of the grommet 125 refers to the portion of the grommet extending from the foot 127 above the shoulder 131 and along the outer surface of the anode can sidewall 108. It is contemplated, however, that the upstanding flange portion of the foot 127 may be omitted from the grommet 125 without departing from the scope of the disclosure.

It is to be noted that while the sidewall 129 of the grommet illustrated in FIG. 2 in the assembled configuration of the button cell 101 is cylindrical and has a generally circular cross-section in accordance with the shape of the anode can 105 and cathode can 110, it is to be understood that upon assembly of the cell the grommet sidewall 129 generally conforms to the shape of the spacing between the cathode can 110 and anode can 105, which may or may not be circular in cross-section. Thus, it is contemplated that in the assembled configuration of the cell 101 the grommet sidewall may be non-cylindrical and/or have a non-circular (e.g., ovate) cross section without departing from the scope of the disclosure. It is to be further noted that it is also contemplated that while the grommet sidewall 129 illustrated in FIG. 2 has a substantially uniform diameter (except at its crimped terminal end) in the assembled configuration of the cell 101, the anode can 105 and cathode can 110 may be configured such that the diameter of the grommet sidewall 129 upon assembly is non-uniform.

It is to be further noted that, as illustrated in FIG. 2, the terminal end 130 of the sidewall 129 of grommet 125 extends beyond the terminal end 139 of the cathode can 110. A particularly advantageous feature of the present disclosure is that the thicker, or upper, portion of the grommet sidewall actually conforms to, or curls over, the anode can here. In one particular embodiment, the thinner, or lower, portion of the grommet sidewall has a substantially constant thickness over a height that is substantially equal to the height of the anode can sidewall; that is, the lower portion of the grommet side wall and the anode can sidewall are substantially mated. Such an arrangement may be desirable because, for example, variations in thickness in the grommet sidewall in this particular region may result in the presence of gaps between the sidewalls of the anode can and the cathode can, unless these sidewalls are for example tapered. However, such a construction or design (i.e., tapered can sidewalls) may make cell assembly more complicated and/or expensive.

Referring again to FIG. 3, one embodiment of the grommet of the present disclosure, prior to its assembly in the cell (hereafter referred to as the unassembled grommet, or the unassembled configuration of the grommet), is illustrated. The sidewall 129 of the unassembled grommet 125 has a non-uniform outer diameter, and in particular includes a segment 129a wherein the outer diameter of the grommet tapers outward (e.g., increases). The taper may facilitate, for example, ejection of the grommet from an injection molding apparatus during manufacturing (as further detailed elsewhere herein), as well as facilitate the insertion of the anode can into the grommet. Additionally, with respect to removing the grommet from the injection molding apparatus, it is to be noted that the grommet may optionally include a pull ring 160 which protrudes from the upper portion thereof, to aid in removal of the grommet from the mold once it has been prepared. It is to be further noted that, for purposes of the present disclosure, the additional width or thickness this may add to the upper portion of the present grommet, and/or to a conventional grommet which has such a ring (for purposes of comparison), is not to be confused with a grommet having an upper portion of increased thickness, as detailed herein (that is, the width or thickness added by the pull ring to the upper portion of the present grommet, or a conventional grommet, is to be disregarded for purposes of the present disclosure).

Also illustrated in FIG. 3, the grommet sidewall 129 includes portions of varying thicknesses, and more specifically includes: (i) a lower portion L extending between a point 132 (which generally corresponds to a point in the sidewall that is about adjacent to the terminal end of the anode can, as depicted in FIG. 2), and point 159; (ii) an upper portion U extending between point 155 and the (upper) terminal end 130 of the grommet sidewall 129; and, (iii) a transition portion TR which bridges the upper and lower portions of the grommet sidewall, the transition portion thus extending between point 155 and point 159. This transition portion, as further detailed herein below, has a thickness which varies over the height thereof.

Upon assembly of the cell 101, the grommet 125 is compressed between the anode can 105 and cathode can 110, such that the outward tapered segment 129*a* of the grommet conforms to the complimentary shapes of the anode can sidewall 108 and cathode can sidewall 112, thus removing the taper and causing the outer diameter of the grommet sidewall 129 to become more uniform. Accordingly, it is to be noted that as used herein, reference to a dimension of the grommet 125 is intended to refer to the dimension of the unassembled grommet (i.e., as initially formed) before assembly into the cell 101. For example, reference to the outer diameter of the grommet sidewall 129 means the minimum outer diameter of the sidewall 129 of the unassembled grommet 125. The minimum outer diameter D1 of the sidewall 129 of the grommet 125 illustrated in FIG. 3 corresponds to the outer diameter of the sidewall toward the lower end thereof, e.g., below the outward tapered segment 129*a*. This minimum outer diameter of the grommet sidewall 129 corresponds generally to the uniform outer diameter of the grommet sidewall 129 in the assembled configuration of the cell 101 as illustrated in FIG. 2. It is to be further understood that where the sidewall 129 of the unassembled grommet is instead uniform, the minimum outer diameter of the sidewall is essentially the same as the uniform outer diameter thereof. Finally, it is to be understood that the thickness of an upper portion, lower portion, and transition (when present) portion of the grommet sidewall 129 refers to the thickness of these portions of the unassembled grommet.

Following assembly of the anode 102 and cathode 103 together, the terminal end 139 of the cathode can 110 is crimped down over the edge margin of the top wall 107 of the anode can 105, with the terminal end 130 of the grommet sidewall 129 compressed therebetween, to hold the anode and cathode cans in sealed assembly with each other. Upon crimping of the terminal end of the cathode can 110, the terminal end 133 of the anode can 105 is urged against the shoulder 131 defined by the foot 127 of the grommet 125 to further seal the cell 101 against leakage.

Figure 4:
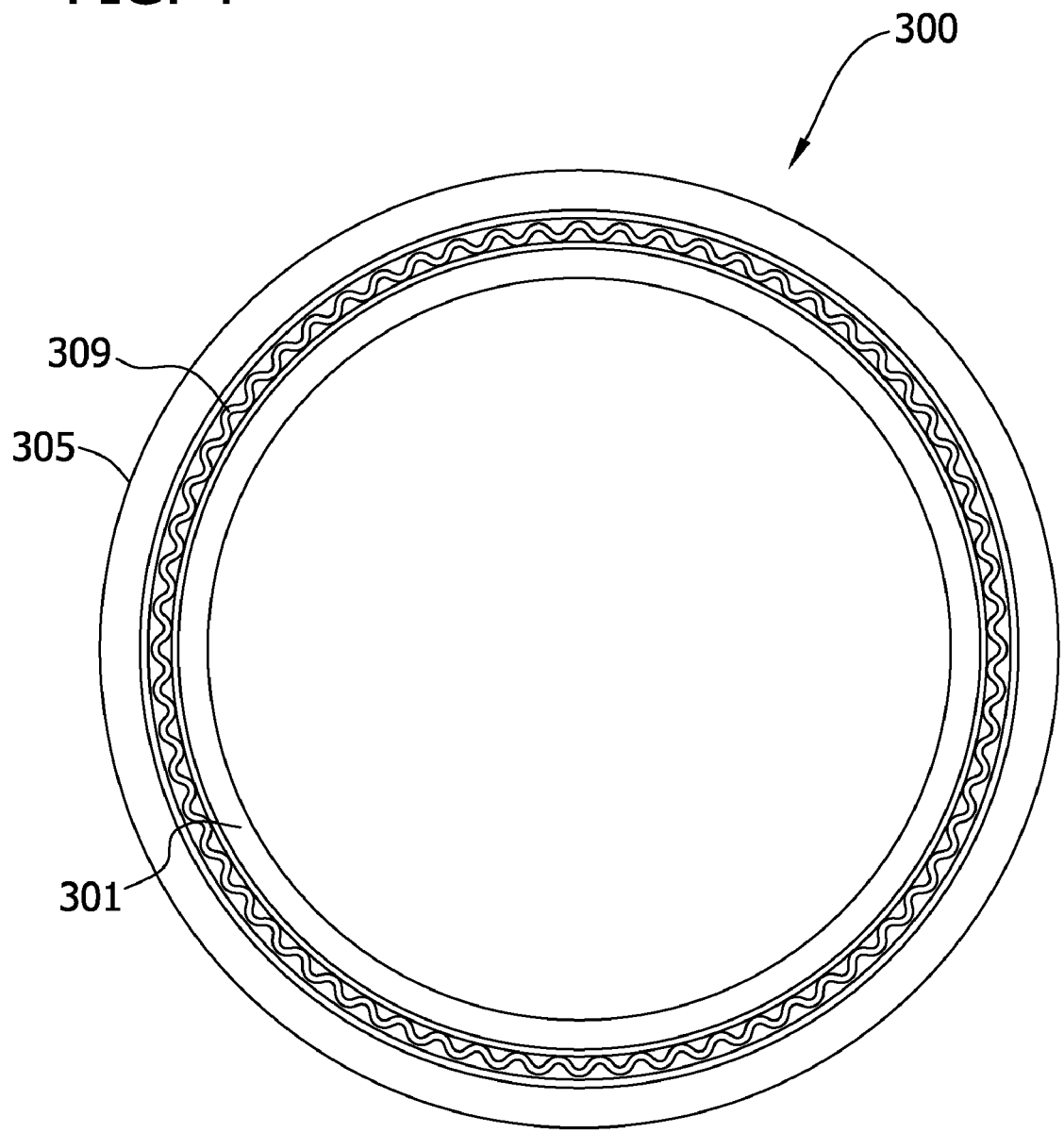
FIG. 4 illustrates a top view of an assembled, conventional button cell, wherein the grommet is wrinkled (or has a "flower-like" shape).

FIG. 4 depicts a top view of a prior art cell 300 containing an anode can 301, a cathode can 305, and a grommet 309 that has a sidewall that is relatively thin over the entire height thereof (e.g., the thickness of the grommet over essentially the entire height thereof is a substantially constant 0.1 mm). FIG. 4 illustrates the wrinkling that is typically observed in the portion of the sidewall of the grommet that protrudes from the point where the cathode can 305 is crimped around the anode can 301. This wrinkling is further illustrated by the anode can depicted on the right in FIG. 6 (602).

Figure 5:
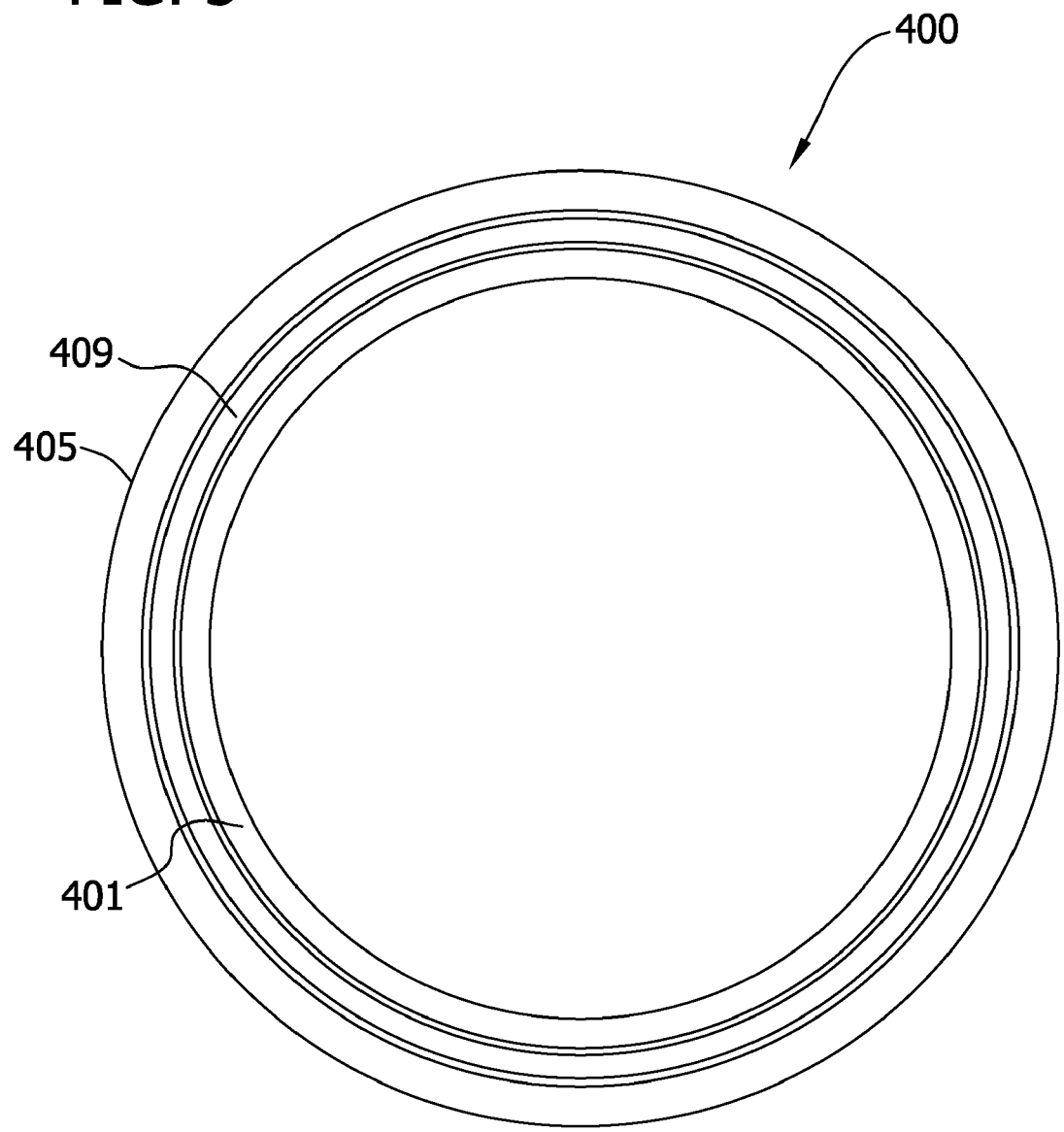
FIG. 5 illustrates a top view of an assembled button cell of one embodiment of the present disclosure, wherein the grommet is not wrinkled.
Figure 6:
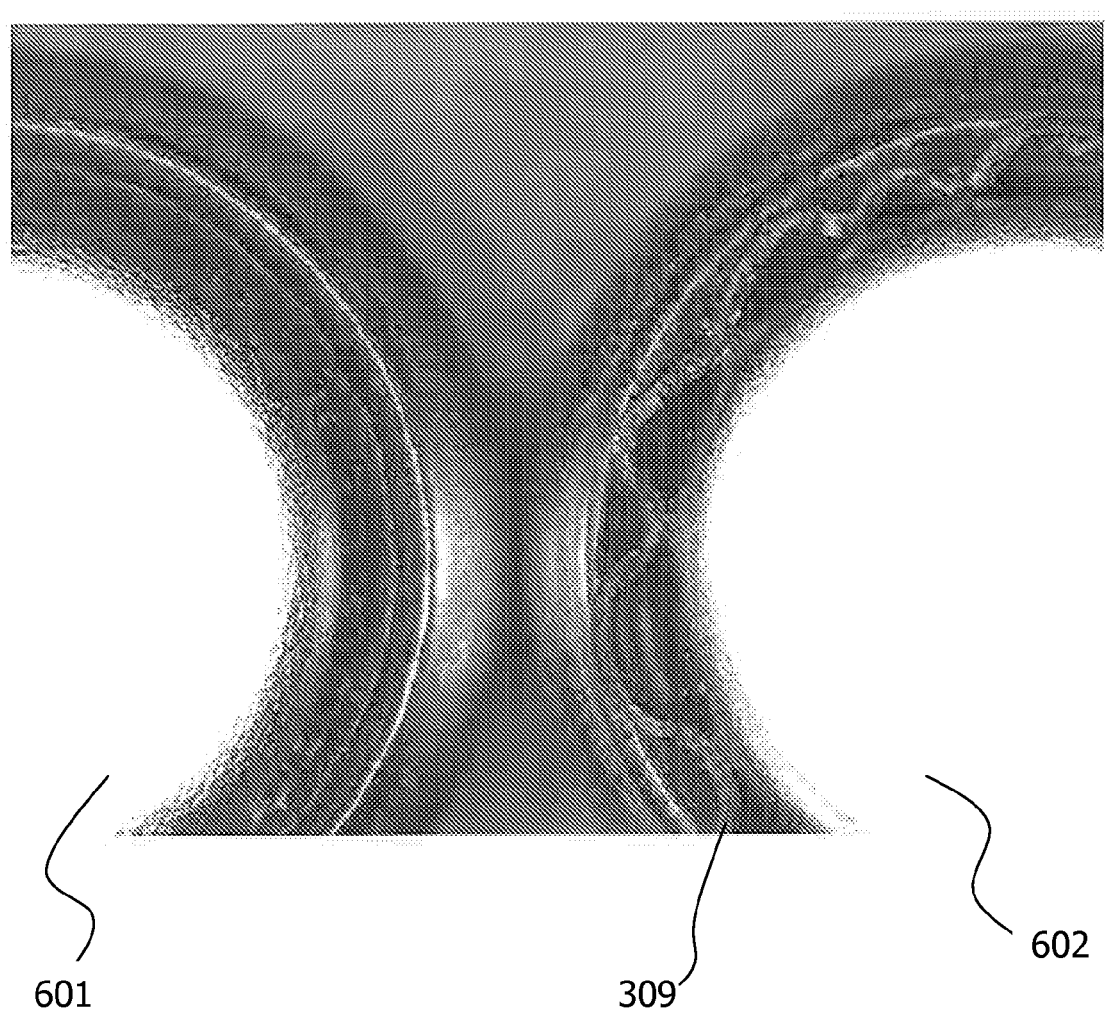
FIG. 6 includes photocopies of photographs of portions of button cells prepared using a grommet of the present disclosure (601) and a conventional grommet (602), the conventional grommet clearly exhibiting wrinkling (or a "flower-like" shape).

In contrast to the conventional grommet and cell illustrated and depicted in FIGS. 4 and 6 (602), FIG. 5 illustrates the top view of a cell 400 containing an anode can 401, a cathode can 405, and a grommet 409 of the present disclosure (as detailed, for example, in FIG. 3). As illustrated, due to the increased thickness of the upper portion of the present grommet, the grommet maintains its structural integrity around the diameter of the cell and avoids wrinkling in the area protruding from the point where the cathode can is crimped around the anode can. The absence of this wrinkling is further illustrated by the anode can depicted on the left in FIG. 6 (601).

Generally speaking, the cells of the present disclosure operate in a manner similar to that of a conventional cell. For example, in the embodiment illustrated in FIG. 2, air enters the cell 101 through holes 119 in the bottom wall 111 of the cathode can 110 and is reduced in the cathode assembly 114, forming hydroxyl ions, when the cell is being discharged. The hydroxyl ions migrate through the semi-permeable separator 118 and participate in the oxidation of the metal of the anode material 106. The electrical potential between the anode and the cathode drives the chemical reactions in the cell 101 and generates current in an external circuit (not illustrated), when the cell is being discharged. This electrical current can be used to power electrical devices.

The construction and operation of electrochemical cells, and in particular the electrochemical reactions of such cells, is well known in the art and is therefore not described further herein. The particular constructions of the anode can and cathode can are also known and are not described further herein except to the extent necessary to describe the present disclosure. Examples of suitable anode and cathode constructions are disclosed in U.S. Pat. No. 5,804,327, the disclosure of which is incorporated herein by reference to the extent that it is consistent, i.e., does not conflict with, the present disclosure.

As previously noted, and as can be observed by comparing the prior art cell of FIG. 1 to the present cell of FIG. 2 and the grommet depicted in, for example, FIG. 3, the grommet of the present disclosure has portions of varying thickness; that is, the grommet of the present disclosure has an upper portion (e.g., a portion near the top wall of the anode can) having a thickness which is greater than the thickness of a lower portion thereof (e.g., a portion near the terminal end of the anode can sidewall). In particular, and as previously noted and illustrated in FIG. 3, one embodiment of the grommet of the present disclosure has a sidewall which, beginning at a point 132 (FIG. 3) near the terminal end of the anode can and proceeding upward, has a lower portion, L, a transition portion, TR, and an upper portion, U. The particular heights and dimensions of the lower, upper, and transition portions of the grommet of the present disclosure, such as that depicted in FIG. 3, are generally selected to provide a grommet that allows for a finished cell of the desired characteristics (e.g., maximum internal volume, to optimize performance, and/or minimum outer dimension, so as to limit overall cell size). Typically, however, the upper portion of the grommet sidewall has a thickness which exceeds the thickness of the lower portion by at least about 20%, at least about 25%, at least about 30%, at least about 40%, at least about 50%, at least about 60%, at least about 80%, at least about 100% or more (e.g., about 150%, about 200%, about 250% or more). For example, the thickness of the upper portion may, in some instances, be at least about 20% and less than about 100% greater than the thickness of the lower portion, or at least about 25% and less than about 80%, or at least about 30% and less than about 60%, or at least about 40% and less than about 50%, greater than the thickness of the lower portion.

In this regard it is to be noted that, as used herein, "thickness" refers to the approximate mean thickness of the grommet sidewall within the noted portion thereof. It should be understood that some minor variations of the sidewall thickness, over a given height or circumference thereof, are within manufacturing tolerances and are both expected and accepted. Generally speaking, however, the thickness of both the lower and upper portions of the grommet sidewall typically remains substantially constant. For example, the thickness of both the lower and upper portions of the grommet sidewall may vary, independently, over the given heights of these portions by less than about 15%, less than about 12% or even less than about 10%, and in some instances may vary by less than about 8%, less than about 6%, less than about 4%, or even less than about 2%.

As illustrated in FIG. 3, in one embodiment the grommet of the present disclosure includes a transition portion TR along the sidewall that extends between the upper portion U and lower portion L, which serves to bridge the upper and lower portions. The thickness of the transition portion generally increases from about equal to that of the lower portion to about equal to that of the upper portion. The thickness of the transition portion typically increases gradually over the height of the sidewall, from the thickness of the lower portion to the thickness of the upper portion. Thus, in this embodiment there are typically no significant or "step" increases (e.g., an increase in thickness of the sidewall that is near or equal to the height of the portion of the sidewall over which the increase occurs) in the thickness of the transition portion of the sidewall, or essentially the entire height of the sidewall. However, the thickness of the transition portion of the grommet sidewall does vary or change more than that of either or both of the lower and upper portions of the sidewall. For example, generally speaking, the change in thickness of the transition portion over the height thereof is typically essentially equal to the difference in thickness of the upper and lower portions of the sidewall. Accordingly, in some instances the thickness of the transition portion may vary over the height thereof by at least about 20%, at least about 25%, at least about 30%, at least about 40%, at least about 50%, at least about 60%, at least about 80%, or even at least about 100%. For example, in some instances, the thickness of the transition portion may vary over the height thereof by at least about 20% and less than about 100%, or at least about 25% and less than about 80%, or at least about 30% and less than about 60%, or at least about 40% and less than about 50%.

As with variation in thickness of the above-noted portions of the grommet sidewall, the relative heights of the upper, lower and transition portions of the sidewall (e.g., the proportion of the overall height of the sidewall occupied by portions U, TR, and L depicted in FIG. 3) may be optimized for a given application and/or button cell design. Generally speaking, the proportion of the grommet sidewall attributed to the relatively thin lower portion and the proportion of the grommet sidewall attributed to the relatively thick upper portion are each sufficient to provide the benefits associated therewith; that is, the height of the lower portion is typically sufficient to provide a noticeable increase in the volume of the interior cavity of the cell while the upper portion typically has a height that provides suitable structural integrity to the grommet during cell manufacture and in the finished cell. Typically, however, the lower portion of the grommet extends over at least about 50%, at least about 60%, at least about 70%, at least about 80% or even at least about 90% of the height of the sidewall. For example, in some instances the lower portion of the grommet sidewall may extend over about 50% to about 90%, or about 60% to about 80%, of the height of the grommet sidewall. The upper portion of the grommet sidewall typically extends over at least about 5%, at least about 10%, at least about 15%, at least about 20%, at least about 25%, or at least about 30% of the height of the grommet sidewall. For example, in some instances the upper portion of the grommet sidewall may extend over about 5% to about 30%, or about 10% to about 25%, of the height of the grommet sidewall.

As noted elsewhere herein, the sidewall of the grommet of the present disclosure may or may not include a transition portion; that is, in some embodiments the upper and lower portions of the sidewall may be about adjacent, one portion beginning about where the other ends, while in other embodiments the upper and lower portions may be separated and bridged by a transition portion. When present, the portion of the grommet sidewall attributed to the transition portion is, at least in part, a function of the heights of the upper and lower portions of the sidewall. Typically, however, when present the transition portion of the grommet extends over at least about 1%, at least about 5%, at least about 10%, at least about 15%, at least about 20%, at least about 25% or even at least about 30% of the height of the grommet sidewall. For example, in some instances the transition portion may extend over about 1% to about 30%, or about 5% to about 25%, or about 10% to about 20% of the height of the grommet sidewall.

Referring again to FIG. 3, it is to be noted that the height of the grommet sidewall, denoted H1, may be optimized for a given application and/or button cell design. Typically, however, the height of the grommet sidewall is at least about 1 mm, and may be at least about 2 mm, at least about 3 mm, or even at least about 4 mm. For example, in some instances the height H1 of the grommet may typically be within the range of from about 1 mm to about 5 mm, or from about 2 mm to about 4 mm. Accordingly, and in view of the details provided above, the lower portion of the grommet sidewall may typically have a height of, for example, greater than about 0.75 mm to less than about 3 mm, or from about 1 mm to about 2.5 mm, or from about 1.25 mm to about 2 mm. Similarly, the upper portion may have a height of, for example, greater than about 0.2 mm to about 1 mm, or from about 0.25 mm to about 0.75 mm, or from about 0.3 mm to about 0.6 mm. Finally, the transition portion may have a height of, for example, greater than 0.1 mm to less than about 0.5 mm, or greater than about 0.2 mm to about 0.4 mm.

In accordance with the present disclosure, and as depicted in FIG. 3 for example, the thickness of the lower portion of the grommet sidewall, in various embodiments, may be at least about 0.075 mm, at least about 0.09 mm, at least about 0.1 mm, or even at least about 0.12 mm. Typically, however, the thickness of the lower portion is from about 0.075 mm to about 0.15 mm, or about 0.09 mm to about 0.135 mm, or about 0.1 mm to about 0.125 mm. The thickness of the upper portion of the sidewall, in various embodiments, may be at least about 0.1 mm, at least about 0.12 mm, at least about 0.13 mm, or even at least about 0.14 mm. Typically, however, the thickness of the upper portion is from about 0.1 mm to about 0.175 mm, or about 0.12 mm to about 0.16 mm, or about 0.13 mm to about 0.15 mm. Accordingly, the transition portion which bridges the upper and lower portions may have a thickness which ranges from, on the lower end, the thickness of the lower portion and, on the upper end, the thickness of the upper portion (e.g., from about 0.9 mm to about 0.16 mm, or about 0.1 mm to about 0.15 mm). The transition portion may, therefore, have a change in thickness (i.e., a delta thickness, or $\Delta_{thickness}$) over the height thereof which is about 0.02 mm, about 0.03 mm, about 0.04 mm, about 0.05 mm, or about 0.06 mm.

Referring again to FIG. 3, it is to be noted that the grommet has an outer diameter D1 which may vary, depending, for example, on the size of the button cell in which it is to be used. Typically, however, the outer diameter D1 of the grommet is generally at least about 5 mm, at least about 7 mm, at least about 9 mm, or at least about 11 mm. Typically, the outer diameter D1 of the grommet is from about 5 mm to about 11 mm, or from about 7 mm to about 9 mm.

As previously noted, in an alternative embodiment, the grommet of the present disclosure may not contain the above-noted transition portion; rather, the above-noted and described lower portion may end where the above-noted and described upper portion begins. In yet another embodiment, the grommet of the present disclosure may alternatively include a smaller transition portion between the upper and lower portions, as compared to that described herein above. For example, in such embodiments, the transition portion may have a height of less than 0.1 mm (e.g., 0.08 mm, 0.06 mm, 0.04 mm, 0.02 mm or less). In such embodiments, the lower portion may typically account for a greater percentage of the height of the grommet sidewall. For example, in such embodiments the lower portion may account for about 75%, about 80%, about 85%, about 90% or even about 95%, with substantially the balance of the sidewall height being accounted for by the upper portion (e.g., the upper portion accounting for about 5%, about 10%, about 15%, etc., of the sidewall).

Figure 7:
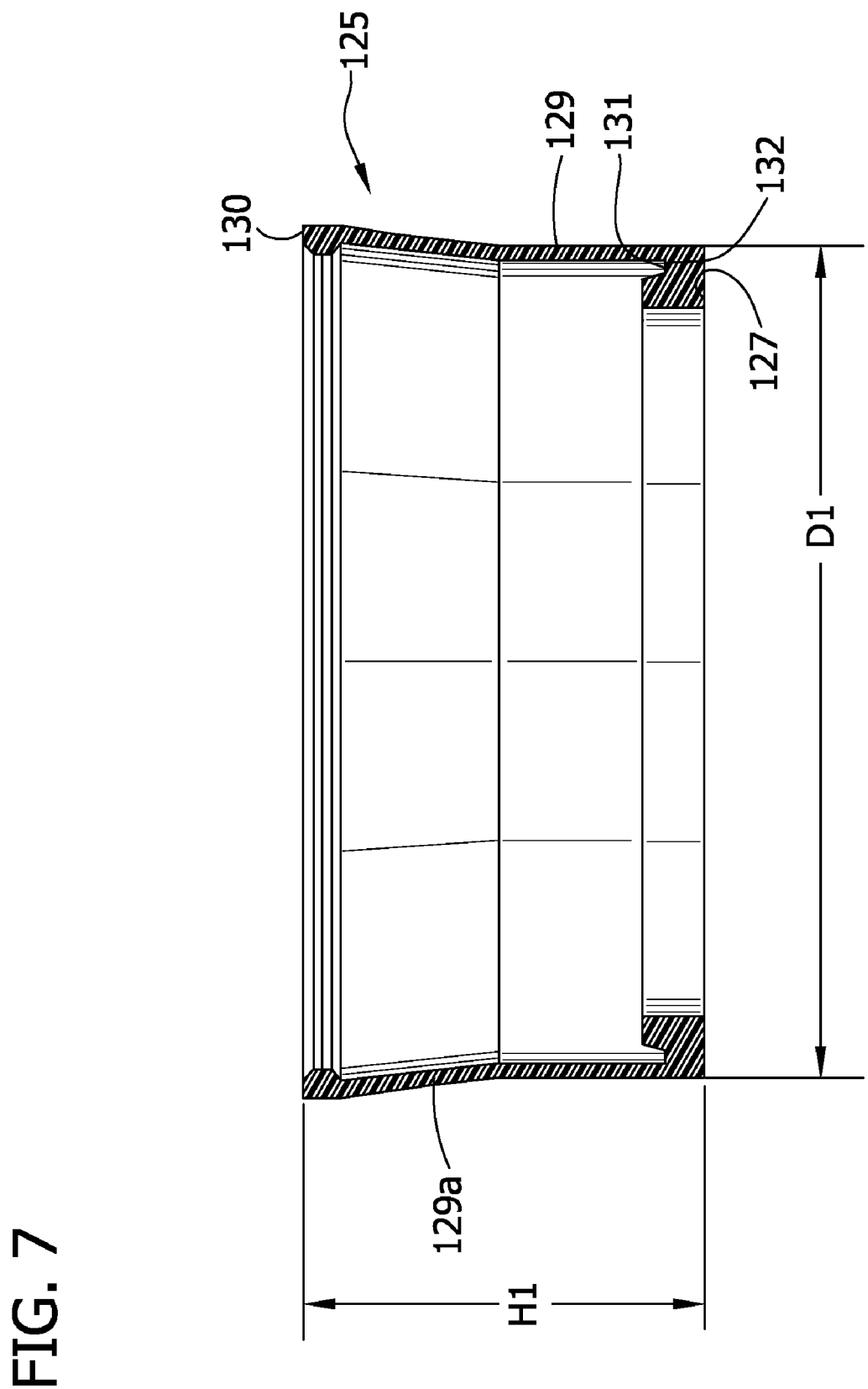
FIG. 7 illustrates a cross-section of a grommet of one embodiment of the present disclosure having portions of varying thicknesses.

Referring now to FIG. 7, one particular alternative embodiment is illustrated. In this particular embodiment, the upper portion does not have a thickness which remains substantially constant over the height thereof. Rather, as illustrated in FIG. 7, the upper portion has a "ring-like" design. More specifically, the upper portion has a thickness which increases over some height thereof, and then remains substantially constant over some height which is less than the total height of the upper portion. For example, the thickness may remain substantially constant over about 20%, about 40%, about 60%, or about 80% of the height of the upper portion. Optionally, the thickness of the upper portion may decrease (as illustrated in FIG. 7) over some final height thereof.

In this regard it is to be noted that, in this particular embodiment, a pull ring is not present in or protruding from the upper portion of the grommet. Rather, the upper portion itself may serve as a means by which to remove the grommet from the mold, once it has been prepared.

It is to be noted that the precise design of the upper portion may be other than herein described without departing from the scope of the present disclosure. However, in one particular embodiment, the upper portion increases in thickness at about a 45 degree angle (or increases in thickness 1 unit per unit of height) until the desired thickness is reached, at which point it may then remain constant for a given height of the sidewall (as noted above), and then it may optionally decrease at a 45 degree angle (or decrease in thickness 1 unit per unit of height) once again until the terminal end of the grommet is reached. The maximum thickness of the upper portion may be the same as detailed herein above. Furthermore, the overall height of this alternative upper portion may also be the same as detailed herein above.

In yet another alternative of the "ring-like" embodiment noted above, thickness may decrease to a second thickness, where it remains substantially constant until the terminal end of the grommet is reached. As a result, a substantially straight vertical sidewall near the terminal end of the grommet is present in this upper portion.

Advantageously, an electrochemical cell that includes the grommet of the present disclosure has an increased interior cavity volume, and more specifically the volume defined by the anode cavity (see, e.g., anode cavity 109 in FIG. 2), without any necessary increase in the overall size of the cell. For example, in various embodiments, the internal volume of the anode cavity may be increased by at least about 5%, at least about 7.5%, at least about 10% or more, as compared to conventional cells (e.g., cells having a design similar to the cells of the present disclosure, but for the improved grommet detailed herein).

II. Grommet Manufacturing Method

The grommet of the present disclosure may, in general, be prepared using means known in the art. For example, such grommets may be suitably formed in an injection molding apparatus, using equipment, process steps, process conditions and materials generally known in the art. Briefly, such a process involves the steps of forming a mold to have a mold cavity configured to the desired size and shape of the grommet. Molten material is injected through a gate leading to an annular entryway into the cavity and extending substantially continuously around an inner edge of the cavity. The molten material is allowed to solidify in the cavity, thereby forming a grommet, which is then removed from the mold.

Figure 8:
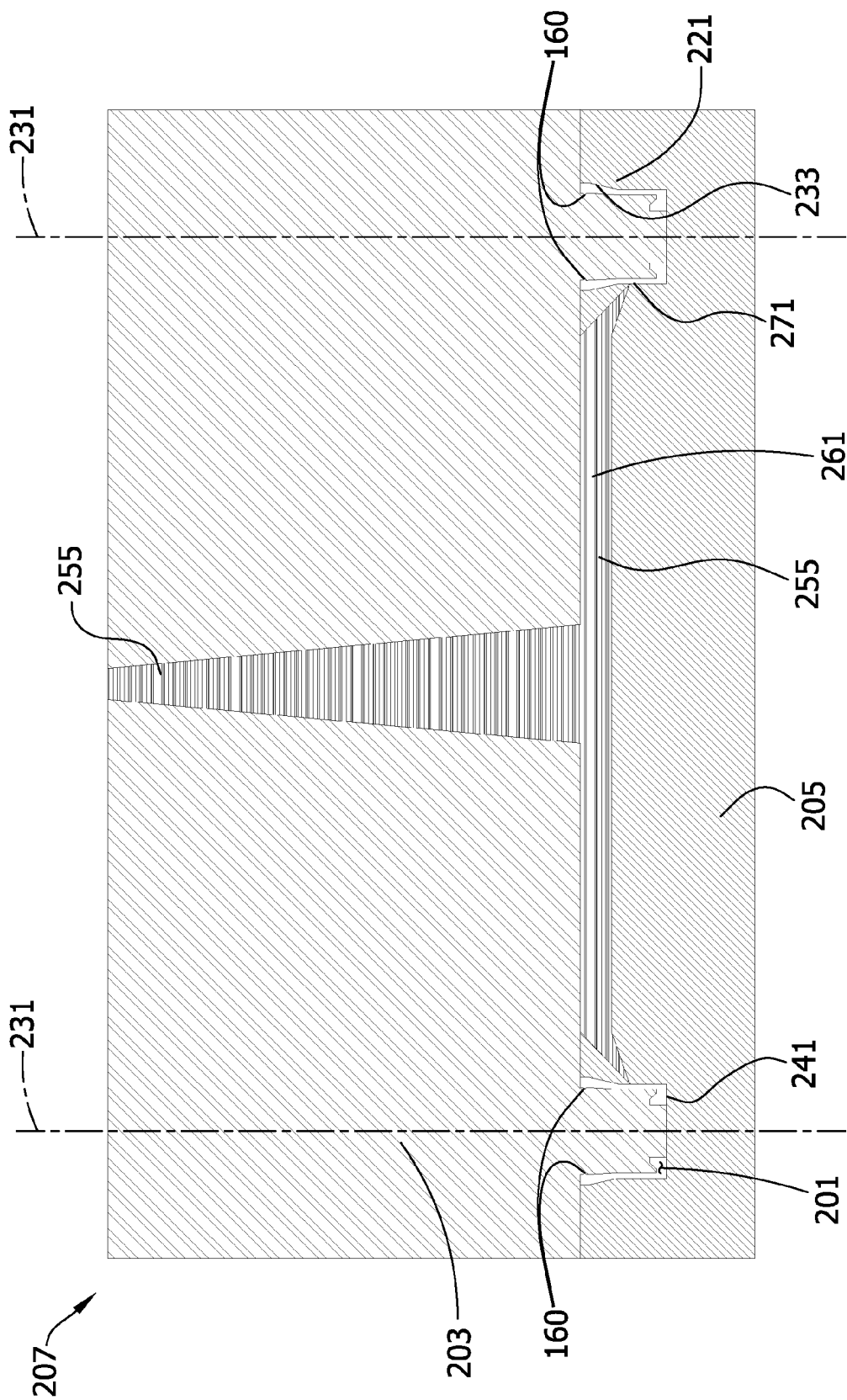
FIG. 8 illustrates a schematic diagram depicting a mold cavity being filled in accordance with one embodiment of an injection molding process of the present disclosure.

Referring now to FIG. 8, it is to be noted that the mold cavity 201 may be formed, for example, by bringing together at least two mold plates 203, 205 of a mold 207. The mold cavity 201 is suitably sized and shaped to yield the unassembled grommet 125 of FIG. 3, which has portions of varying thickness. The cavity 201 suitably includes a cylindrical, or more suitably tubular, and even more suitably annular, sidewall portion 221 having a central longitudinal axis 231 corresponding to the sidewall 129 of the grommet 125 being molded. The sidewall portion 221 may suitably have a non-uniform diameter, such as being tapered outward at an upper segment 233 of the sidewall portion as illustrated in FIG. 8, or the diameter of the sidewall portion may be substantially uniform. The tapered upper segment 233 facilitates removal of the grommet from the mold 207, as well as facilitating later assembly with the anode can. The mold cavity 201 also suitably includes a foot portion 241 open to the lower end of the sidewall portion 221 and extending radially inward therefrom to correspond to the foot 127 of the grommet 125. The foot portion 241 of the mold cavity 201 may include a raised portion at its radially inner end so as to define the shoulder 131 of the grommet 125 for seating the terminal end 133 of the anode can 105.

Molten material 255 injected into the mold cavity 201 is suitably a thermoplastic resin (e.g., nylon-6,6, such as Zytel 101, commercially available from DuPont). The molten material 255 may be injected from a nozzle (not illustrated) through a gate 271 formed in the mold and disposed in fluid communication with the nozzle. Alternatively, a runner system 261 may be used to establish fluid communication of the gate 271 with the nozzle, e.g., to inject molten material 255 from the nozzle into multiple mold cavities for simultaneously molding a plurality of grommets. The grommet 125 formed upon solidification of the material 255 in the cavity 201 is attached, e.g., at the entryway to the mold cavity, to the material that solidified within the gate 271.

It is to be noted that the embodiment illustrated in FIG. 3, as well as FIG. 8, includes a pull-ring 160 that aids in removing the grommet from the mold cavity 201 by a core pin (not illustrated). In other embodiments of the present disclosure, such as the one illustrated in FIG. 7, the upper portion of the grommet sidewall serves as a pull-ring.

The following Examples describe various embodiments of the present disclosure. Other embodiments within the scope of the appended claims will be apparent to a skilled artisan considering the specification or practice of the disclosure provided herein. It is therefore intended that the specification, together with the Examples, be considered exemplary only, with the scope and spirit of the disclosure being indicated by the claims, which follow the Examples.

EXAMPLES

The following Examples provides data describing conventional electrochemical button cells (Table 1), electrochemical button cells including grommets of the present disclosure (Table 2), and data showing increased volume of the interior cavity of the cell provided by grommets of the present disclosure (Table 3). Unless otherwise noted, all dimensions are in millimeters (mm).

Included in the data are the thicknesses of the upper and lower portions of the sidewall, and the calculated percentage increase in grommet thickness over a transition portion between the upper and lower portion. As shown in Table 1, the conventional grommets exhibit percentage increases in thickness over the transition portion ranging from 0 to 18%. Grommets of the present invention, as shown in Table 2, exhibit percentage increases in thickness over the transition portion ranging from 20% to 60%.

The anode can volume measurements tabulated in Table 3 were calculated using computer aided design (CAD) software in accordance with methods well-known in the art (i.e., the software traces the inside profile of the anode can, grommet foot, and cathode where each creates the anode cavity, then calculates the volume of the resulting area, which is the same effect as tracing that profile in two dimensions and then integrating it over 360 degrees by sweeping around the central axis).

TABLE 1

|  | 1 | 2 | 3 | 4 | 5 | 6 | 7 | 8 | 9 |
|---|---|---|---|---|---|---|---|---|---|
| Cell Properties |  |  |  |  |  |  |  |  |  |
| Cell Size | 10 | 10 | 312 | 312 | 13 | 13 | 675 | 675 | 675 |
| Cell Height | 3.51 | 3.51 | 3.51 | 3.51 | 5.28 | 5.28 | 5.28 | 5.28 | 5.28 |
| Cell Diameter | 5.74 | 5.74 | 7.80 | 7.80 | 7.80 | 7.80 | 11.53 | 11.53 | 11.53 |
| Grommet Properties |  |  |  |  |  |  |  |  |  |
| Overall Dimensions |  |  |  |  |  |  |  |  |  |
| Grommet overall height | 2.642 | 2.642 | 2.311 | 2.311 | 4.216 | 4.216 | 4.267 | 4.369 | 4.369 |
| Outer Diameter | 5.461 | 5.486 | 7.432 | 7.534 | 7.455 | 7.534 | 11.138 | 11.201 | 11.278 |
| Lower Portion |  |  |  |  |  |  |  |  |  |
| Thickness | 0.152 | 0.095 | 0.173 | 0.102 | 0.178 | 0.114 | 0.216 | 0.102 | 0.127 |
| Vertical wall net height | 1.346 | 1.346 | 1.143 | 1.143 | 2.631 | 2.642 | 2.515 | 0.762 | 0.762 |
| Angled wall net height | 0.000 | 1.041 | 0.000 | 0.864 | 1.026 | 1.016 | 0.000 | 3.048 | 3.048 |
| Total lower portion height | 1.346 | 2.388 | 1.143 | 2.007 | 3.658 | 3.658 | 2.515 | 3.810 | 3.810 |
| Upper Portion |  |  |  |  |  |  |  |  |  |
| Thickness | 0.178 | 0.095 | 0.203 | 0.102 | 0.178 | 0.114 | 0.246 | 0.102 | 0.127 |
| Height-vertical wall | 0.254 | 0.254 | 0.229 | 0.305 | 0.559 | 0.559 | 0.584 | 0.559 | 0.559 |
| Transition Portion |  |  |  |  |  |  |  |  |  |
| Height of beginning of transition | 1.346 |  | 1.143 |  |  |  | 2.515 |  |  |
| Height of end of transition | 2.388 |  | 2.083 |  |  |  | 3.683 |  |  |
| Transition net height | 1.041 |  | 0.940 |  |  |  | 1.168 |  |  |
| Thickness Change | 0.025 | 0.000 | 0.030 | 0.000 | 0.000 | 0.000 | 0.030 | 0.000 | 0.000 |
| Characteristics |  |  |  |  |  |  |  |  |  |
| Thickness Increase, % | 17% | 0% | 18% | 0% | 0% | 0% | 14% | 0% | 0% |
| Lower Portion % of total wall | 51% | 90% | 49% | 87% | 87% | 87% | 59% | 87% | 87% |
| Upper Portion % of total wall | 10% | 10% | 10% | 13% | 13% | 13% | 14% | 13% | 13% |
| Transition Portion % of total wall | 39% | 0% | 41% | 0% | 0% | 0% | 27% | 0% | 0% |

TABLE 2

|  | 10 | 11 | 12 | 13 | 14 | 15 | 16 | 17 | 18 |
|---|---|---|---|---|---|---|---|---|---|
| Cell Properties |  |  |  |  |  |  |  |  |  |
| Cell Size | 10 | 10 | 10 | 10 | 312 | 312 | 13 | 13 | 675 |
| Cell Height | 3.51 | 3.51 | 3.51 | 3.51 | 3.51 | 3.51 | 5.28 | 5.28 | 5.28 |

TABLE 2-continued

|  | 10 | 11 | 12 | 13 | 14 | 15 | 16 | 17 | 18 |
|---|---|---|---|---|---|---|---|---|---|
| Cell Diameter | 5.74 | 5.74 | 5.74 | 5.74 | 7.80 | 7.80 | 7.80 | 7.80 | 11.53 |
| Grommet Properties | | | | | | | | | |
| Overall Dimensions | | | | | | | | | |
| Grommet overall height | 2.642 | 2.591 | 2.591 | 2.591 | 2.311 | 2.159 | 4.216 | 4.216 | 4.293 |
| Outer Diameter | 5.486 | 5.486 | 5.537 | 5.512 | 7.584 | 7.584 | 7.534 | 7.595 | 11.278 |
| Lower Portion | | | | | | | | | |
| Thickness | 0.095 | 0.095 | 0.095 | 0.095 | 0.102 | 0.102 | 0.114 | 0.114 | 0.127 |
| Vertical wall net height | 1.346 | 1.295 | 1.295 | 1.295 | 1.143 | 0.991 | 2.642 | 2.642 | 0.762 |
| Angled wall net height | 0.559 | 0.610 | 0.610 | 0.610 | 0.508 | 0.508 | 0.889 | 0.889 | 2.616 |
| Total lower portion height | 1.905 | 1.905 | 1.905 | 1.905 | 1.651 | 1.499 | 3.531 | 3.531 | 3.378 |
| Upper Portion | | | | | | | | | |
| Thickness | 0.152 | 0.152 | 0.127 | 0.152 | 0.127 | 0.127 | 0.152 | 0.152 | 0.152 |
| Height-vertical wall | 0.254 | 0.254 | 0.254 | 0.254 | 0.305 | 0.305 | 0.559 | 0.559 | 0.711 |
| Transition Portion | | | | | | | | | |
| Height of beginning of transition | 1.905 | 1.905 | 1.905 | 1.905 | 1.651 | 1.499 | 3.531 | 3.531 | 3.378 |
| Height of end of transition | 2.388 | 2.337 | 2.337 | 2.337 | 2.007 | 1.854 | 3.658 | 3.658 | 3.581 |
| Transition net height | 0.483 | 0.432 | 0.432 | 0.432 | 0.356 | 0.356 | 0.127 | 0.127 | 0.203 |
| Thickness Change | 0.057 | 0.057 | 0.032 | 0.057 | 0.025 | 0.025 | 0.038 | 0.038 | 0.025 |
| Characteristics | | | | | | | | | |
| Thickness Increase, % | 60% | 60% | 33% | 60% | 25% | 25% | 33% | 33% | 20% |
| Lower Portion % of total wall | 72% | 74% | 74% | 74% | 71% | 69% | 84% | 84% | 79% |
| Upper Portion % of total wall | 10% | 10% | 10% | 10% | 13% | 14% | 13% | 13% | 17% |
| Transition Portion % of total wall | 18% | 17% | 17% | 17% | 15% | 16% | 3% | 3% | 5% |

TABLE 3

| Cell | Diameter | Cathode Can Base | Cathode Can Wall | Lower Portion Grommet Thk. | Anode Can Thk. | Volume (microliters) | Percent Increase |
|---|---|---|---|---|---|---|---|
| 1 | 5.74 | 0.127 | 0.107 | 0.152 | 0.127 | 43.6 | |
| 10-13 | 5.74 | 0.127 | 0.107 | 0.095 | 0.102 | 47.2 | 8.3% |
| 3 | 7.8 | 0.152 | 0.107 | 0.172 | 0.127 | 79.4 | |
| 14, 15 | 7.8 | 0.152 | 0.107 | 0.102 | 0.102 | 87.0 | 9.6% |
| 5 | 7.8 | 0.152 | 0.107 | 0.178 | 0.127 | 147.8 | |
| 16, 17 | 7.8 | 0.152 | 0.107 | 0.114 | 0.102 | 159.0 | 7.6% |
| 7 | 11.53 | 0.165 | 0.147 | 0.216 | 0.191 | 352 | |
| 18 | 11.53 | 0.152 | 0.132 | 0.127 | 0.127 | 387 | 9.9% |

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

What is claimed is:

1. A grommet for use in an electrochemical button cell to electrically insulate an anode can from a cathode can of the button cell, the grommet being constructed of a dielectric material and comprising a generally tubular sidewall, the sidewall comprising an upper portion and a lower portion, the upper portion having an uncompressed thickness that exceeds an uncompressed thickness of the lower portion by at least 20%.

2. The grommet of claim 1 wherein the thickness of the upper portion exceeds the thickness of the lower portion by at least 30%.

3. The grommet of claim 1 wherein the thickness of the upper portion exceeds the thickness of the lower portion by from about 30% to about 60%.

4. The grommet of claim 1 wherein the thickness of the upper portion is from about 0.1 mm to about 0.175 mm.

5. The grommet of claim 1 wherein the upper portion extends over at least 5% of the height of the sidewall.

6. The grommet of claim 1 wherein the upper portion extends over from about 10% to about 25% of the height of the sidewall.

7. The grommet of claim 1 wherein the lower portion extends over at least 50% of the height of the sidewall.

8. The grommet of claim 1 wherein the lower portion extends over from about 50% to about 90% of the height of the sidewall.

9. The grommet of claim 1 wherein the sidewall further comprises a transition portion between said upper and lower portions.

10. The grommet of claim 9 wherein said transition portion has a thickness which varies over the height thereof by at least 20%.

11. An electrochemical cell comprising:
a cathode comprising an electrically conductive cathode can having a bottom wall and a sidewall extending up from the base, the bottom wall and sidewall together defining a cavity of the cathode can;
an anode comprising an electrically conductive anode can having a top wall and a sidewall depending from the top wall, the top wall and the sidewall of the anode can together defining a cavity thereof, the anode can being at least in part disposed in the cathode can with at least a portion of the anode can sidewall in generally opposed relationship with at least a portion of the cathode can sidewall; and
a dielectric grommet having a sidewall disposed between said opposed portions of the anode can sidewall and the cathode can sidewall to electrically insulate the anode can from the cathode can, the grommet sidewall comprising an upper portion and a lower portion, the upper portion having an uncompressed thickness that exceeds an uncompressed thickness of the lower portion by at least 20%.

12. The electrochemical cell of claim 11 wherein the thickness of the upper portion of the grommet sidewall exceeds the thickness of the lower portion of the grommet sidewall by at least 30%.

13. The electrochemical cell of claim 11 wherein the thickness of the upper portion of the grommet sidewall exceeds the thickness of the lower portion of the grommet sidewall by from about 30% to about 60%.

14. The electrochemical cell of claim 11 wherein the thickness of the upper portion of the grommet sidewall is from about 0.1 mm to about 0.175 mm.

15. The electrochemical cell of claim 11 claim 11 wherein the upper portion of the grommet sidewall extends over at least 5% of the height of the sidewall.

16. The electrochemical cell of claim 11 wherein the upper portion of the grommet sidewall extends over from about 10% to about 25% of the height of the sidewall.

17. The electrochemical cell of claim 11 wherein the lower portion of the grommet sidewall extends over at least 50% of the height of the sidewall.

18. The electrochemical cell of claim 11 wherein the lower portion of the grommet sidewall extends over from about 50% to about 90% of the height of the sidewall.

19. The electrochemical cell of claim 11 wherein the sidewall further comprises a transition portion between said upper and lower portions.

20. The electrochemical cell of claim 19 wherein said transition portion has a thickness which varies over the height thereof by at least 20%.

* * * * *